United States Patent [19]

Uchii et al.

[11] 4,028,070
[45] June 7, 1977

[54] METHOD OF RECOVERING ETHYLENE OXIDE

[75] Inventors: Jiro Uchii, Kamakura; Masatsugu Kodo, Tokyo; Tsunehiko Soga, Koza; Yutaka Morimoto, Yokohama, all of Japan

[73] Assignee: Nippon Shokubai Kagaku Kogyo Co., Ltd., Osaka, Japan

[22] Filed: Dec. 8, 1975

[21] Appl. No.: 638,841

Related U.S. Application Data

[63] Continuation of Ser. No. 459,962, April 11, 1974, abandoned.

[52] U.S. Cl. .................................................. 55/48
[51] Int. Cl.² ........................................ B01D 19/00
[58] Field of Search ............. 55/32, 48, 51, 84, 87, 55/178; 252/49.6

[56] References Cited
UNITED STATES PATENTS

| | | | |
|---|---|---|---|
| 2,862,885 | 12/1958 | Nelson et al. | 252/49.6 |
| 3,174,262 | 3/1965 | Lutz | 55/51 X |
| 3,217,466 | 11/1965 | Bogart | 55/48 X |
| 3,616,598 | 11/1971 | Foral, Jr. | 55/32 |
| 3,729,899 | 5/1973 | Cunningham et al. | 55/51 X |
| 3,766,714 | 10/1973 | Cunningham et al. | 55/48 |
| 3,856,484 | 12/1974 | Cocuzza et al. | 55/48 |

*Primary Examiner*—Frank A. Spear, Jr.
*Assistant Examiner*—Robert H. Spitzer
*Attorney, Agent, or Firm*—Sherman & Shalloway

[57] ABSTRACT

A method of recovering ethylene oxide from the reaction product gas that is obtained by the catalytic vapor phase oxidation of ethylene with molecular oxygen over a silver-containing catalyst, which comprises conducting the reaction product gas to an absorption column maintained at a pressure in the range of 2 – 40 kg/cm², countercurrently contacting reaction product gas with an aqueous absorbent in the absorption column to dissolve ethylene oxide in the aqueous absorbent to form an aqueous ethylene oxide solution, conducting the thus formed aqueous solution to a stripping column, stripping and recovering ethylene oxide from aqueous ethylene oxide solution at the stripping column, and thereafter recycling the remaining aqueous solution which is obtained after stripping ethylene oxide to the absorption column to be again used as the aqueous absorbent; characterized by using as the aqueous absorbent one containing ethylene glycol in the range of 0.1 – 40% by weight and a defoaming agent in the range of 0.5 – 1000 ppm and having a pH in the range of 3 – 12.

7 Claims, 1 Drawing Figure

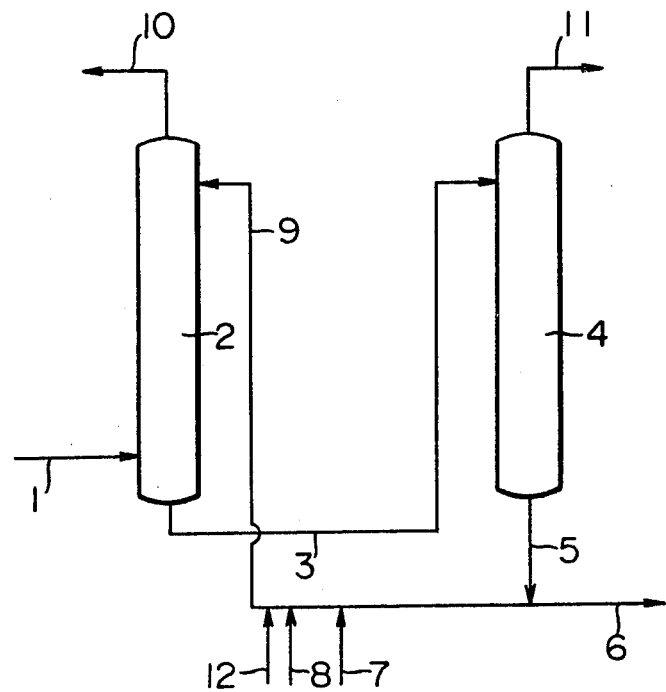

METHOD OF RECOVERING ETHYLENE OXIDE

This is a continuation of Application Ser. No. 459,962, filed Apr. 11, 1974, now abandoned.

This invention relates to an improvement in the method of recovering ethylene oxide from the reaction product gas that is obtained by the catalytic vapor phase oxidation of ethylene with molecular oxygen over a silver containing catalyst.

In recovering ethylene oxide from the reaction product gas that is obtained by the catalytic vapor phase oxidation of ethylene with molecular oxygen, hitherto the method generally employed was that consisting of conducting the reaction product gas to an absorption column, at which the gas was counter-currently contacted with an aqueous absorbent to form an aqueous ethylene oxide solution, which was then conducted to a stripping column, where the ethylene oxide was stripped and recovered from the aqueous solution. On the other hand, ethylene glycol formed by the reaction between ethylene oxide and water was separately recovered as by-product. In this case, either fresh water or the aqueous solution which was obtained after stripping ethylene oxide, i.e., an aqueous solution not containing substantially any ethylene oxide, is generally used as the aqueous absorbent. However, as a practical matter, it would not be economical to recover the ethylene oxide from the reaction product gas using only water, because the amount of water required would be tremendous. Hence, in most cases the latter aqueous solution is being used. However, notwithstanding the fact that a method such as above described is being used, no studies have been made whatsoever concerning the effects that the composition of the aqueous absorbent would have on the recovery of ethylene oxide.

As a consequence of our extensive research from various angles regarding this undeveloped area, we found that the composition of the aqueous absorbent had exceedingly great effects on the rate of ethylene oxide absorbed, the phenomenon of entrainment by flooding and the quality of the ethylene glycol as by-product, and thus that the effective recovery of ethylene oxide could only be achieved by the use of an aqueous absorbent of a specific composition.

Thus, according to the present invention, in the method of recovering ethylene oxide from the reaction product gas that is obtained by the catalytic vapor phase oxidation of ethylene with molecular oxygen over a silver-containing catalyst, wherein an ethylene oxide-containing reaction product gas is conducted to an absorption column maintained at a pressure in the range of 2 - 40 kg/cm$^2$, counter-currently contacted with an aqueous absorbent at the absorption column to dissolve the ethylene oxide in the aqueous absorbent to form an aqueous ethylene oxide solution, which is then conducted to a stripping column, where the ethylene oxide is stripped and recovered from aqueous ethylene oxide solution, and the resulting aqueous solution is recycled to the absorption column to be again used as the aqueous absorbent; there is provided, as an improved method of recovering ethylene oxide from the reaction product gas, that of using as the aqueous absorbent one characterized by containing ethylene glycol in the range of 0.1 – 40% by weight and a defoaming agent in the range of 0.5 – 1000 ppm and having a pH in the range of 3 – 12.

The first requisite in this invention is that the aqueous absorbent must be one whose pH is in the range of 3 – 12, and preferably 5 – 10. When the pH of the aqueous absorbent is lower than 3, the effect of the defoaming agent is weakened. Further, in this case, not only is the equipment corroded or damaged, but there is also the objection that the hydrogen ions act as a catalyst for the reaction between the ethylene oxide and water at the absorption column and the ethylene oxide stripping column to cause the formation of the by-product glycol in a great quantity. On the other hand, when a pH higher than 12 is used for the aqueous absorbent, not only is the effect of the defoaming agent weakened, but there is also the objection that the hydroxyl ions act as a catalyst for the reaction between the by-product glycol and acetaldehyde.

A second requisite in this invention is that the aqueous absorbent must contain ethylene glycol in the range of 0.1 – 40% by weight, preferably 0.5 – 35% by weight, and more preferably 1 – 30% by weight. When the concentration of the ethylene glycol of the aqueous absorbent is less than 0.1% by weight, a large amount of the aqueous absorbent circulating between the absorption column and the ethylene oxide stripping column must be withdrawn and a large amount of fresh water must be introduced. Further, difficulty is experienced in recovering ethylene glycol from a dilute ethylene glycol solution whose concentration of ethylene glycol is less than 0.1% by weight. And since a great amount of heat is required in its concentration, it is exceedingly uneconomical. On the other hand, when an ethylene glycol concentration of above 40% by weight is used, the quality of the ethylene glycol is extremely lowered because such impurities as aldehydes which are contained in the aqueous absorbent, tend to react with each other or with ethylene glycol to form other impurities. Further, in this case, the rate of absorption of ethylene oxide at the absorption column is lowered.

As a third requisite of the present invention, the aqueous absorbent must contain a defoaming agent in the range of 0.5 – 1000 ppm, and preferably 2 – 500 ppm. In the case the concentration of the defoaming agent is a small amount of less than 0.5 ppm, entrainment by flooding due to foaming of the absorbent is set up, with the consequence that, for example, the amount of the absorbent to be introduced to the absorption column must be decreased, or else the normal operation of the absorption column cannot be maintained. As a consequence, an extreme drop in the rate of absorption of ethylene oxide is brought about. Again, if the entrainment by flooding becomes intense, there is the possibility that the operation of the absorption column becomes impossible. On the other hand, when a concentration in the aqueous absorbent of the defoaming agent of more than 1000 ppm is used, the various adverse effects due to foaming are eliminated. However, since effects commensurate with the concentration are not obtained, this would be uneconomical.

According to the present invention, as a consequence of having specified the pH of the aqueous absorbent, the concentration of the ethylene glycol contained and the concentration of the defoaming agent contained, the various problems that arise relative to the rate of absorption of ethylene oxide at the absorption column, the increase or decrease in the amount of the aqueous absorbent due to the entrainment phenomenon by flooding, the quality of the glycol formed as a by-product, etc., can be solved. When there is a departure from at least one of the foregoing three requisites, flooding is set up due to foaming to render it impossible to carry out the normal operation of the absorption column. In consequence, the rate of absorption of ethylene oxide into the aqueous absorbent drops and the quality of the ethylene glycol formed as a by-product is lowered.

The composition of the aqueous absorbent is adjusted to conform with the foregoing requisites by operating, for example, in the following manner. A part of the aqueous absorbent circulating between the absorption column and the ethylene oxide stripping column is withdrawn and conveyed to the ethylene glycol recovering step, and fresh water in an amount corresponding to that withdrawn is replenished, and an alkaline substance and a defoaming agent are continuously or intermittently introduced to the aqueous absorbent. However, it goes without saying that the invention is not restricted by this method.

The absorption column used in this invention may be of any type that are usually used, such as the packed type column or the tray type column. As the packings of the packed type absorption column, various types of packings are available, but preferred are such as the Raschig ring, Pall ring, saddle type ring, spiral ring, Stedman packing and McMahon packing. As the trays of the tray type column, there are also various types that are available, but preferred are such as the bubble-cap tray, uniflex tray, turbogrid tray, ripple tray, flexi tray, sieve tray and ballast tray.

In this invention, for maintaining the pH of the aqueous absorbent at above 3 there may be used a compound which, when dissolved in the aqueous absorbent, exhibits alkalinity, such, for example, as a hydroxide or carbonate of an alkali metal, for example, potassium or sodium. From the commercial standpoint, preferably used are the aqueous solutions of either potassium or sodium hydroxide or sodium carbonate.

While any water-insoluble or water-slightly soluble defoaming agent that is inert to the ethylene glycol formed as a by-product and does not deteriorate the quality of the ethylene glycol during its recovery can be used in this invention, conveniently used are the organopolysiloxanes (silicone oil) or polyalkylene glycol of great hydrophobicity, etc. As the organopolysiloxanes, effectively usable are, for example, either the dimethylpolysiloxanes containing the trimethylsiloxane group and trimethylsilyl group of the formula

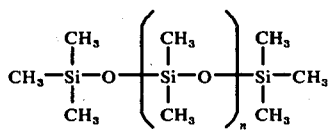

wherein $10,000 > n > 1$ and preferably $1,000 > n > 1$; or a dimethylpolysiloxane containing an alkoxy group of the formula

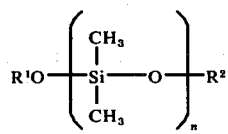

wherein $R^1$ and $R^2$ are each either hydrogen or the same or different alkyl groups, and $10,000 > n > 1$, and preferably $1,000 > n > 1$, or a dimethylpolysiloxane containing the hydroxyl group. The foregoing organopolysiloxanes can be used as such or as a composition in which they are combined with silica. Further, they can be used as an aqueous emulsion by dispersion in water using a suitable emulsifier such, for example, as polyoxyethylenealkylphenol ether, polyoxyethylenesorbitan fatty acid esters, and polyoxyethylene type esters of fatty acids. When considered from the standpoint of commercial operations, the aqueous emulsions of the organopolysiloxanes are conveniently used in view of their excellent dispersibility in the aqueous absorbent, diluting stability and thermal stability. Various methods can be employed for incorporating the defoaming agent in the aqueous absorbent. For instance, one method consists of diluting the aqueous emulsion of organopolysiloxane with 2 - 500-fold amount, preferably 10 - 100-fold amount of either the aqueous absorbent or water and then introducing this diluted emulsion into the aqueous absorbent continuously or intermittently until the concentration of the defoaming agent in the aqueous absorbent comes within the range of 0.5 - 1000 ppm, preferably 2 - 500 ppm.

This invention is effectively used in the case where ethylene oxide is recovered from the reaction product gas that is obtained by catalytic vapor phase oxidation of ethylene with molecular oxygen. As the oxygen source there may be used air, oxygen-enriched air and pure oxygen. The operating conditions of the absorption column will differ depending upon the process by which the ethylene oxide is produced, i.e., whether the ethylene oxide is being produced by oxidation with air or with oxygen-enriched air or with pure oxygen. However, taking the instance where ethylene oxide is to be recovered from the reaction product gas where the ethylene oxide is being produced by the oxidation of ethylene with molecular oxygen using air, in operating the absorption column, conveniently used are the following conditions: a concentration of the ethylene oxide in the reaction product gas of 0.05 - 5% by volume, preferably 0.1 - 4% by volume, a temperature of the aqueous absorbent of not higher than 40° C., preferably not higher than 35° C., and an operating pressure of the absorption column in the range of 2 - 40 kg/cm², while the amount of the aqueous absorbent is determined by the per unit amount of ethylene oxide produced.

The invention will now be more specifically described by reference to the accompanying diagrammatic flow sheet.

A reaction product gas containing 0.05 - 5% by volume of ethylene oxide is introduced via a line (1) to the bottom of either a packed or tray type absorption column (2) maintained at an operating pressure in the range of 2 - 40 kg/cm². On the other hand, an aqueous absorbent whose glycol concentration is in the range 0.1 - 40% by weight, defoaming concentration is in the range 0.5 - 1000 ppm and of pH in the range of 3 - 12 is introduced via a line 9 to the top of the absorption column 2 and counter-currently contacted with the reaction product gas, whereby substantially all of the ethylene oxide contained in the reaction product gas is dissolved in the aqueous absorbent. The absorption column bottom liquid containing ethylene oxide dissolved therein is then withdrawn from the absorption column 2 and conveyed via a line 3 to an ethylene oxide stripping column 4 where the ethylene oxide is stripped by heating. Ethylene glycol is produced as a by-product as a result of the reaction between the ethylene oxide and water. The aqueous solution which is obtained after stripping ethylene oxide is reused as an aqueous absorbent by recycling via a line 9 to the absorption column 2 from the bottom of the stripping column 4. For maintaining the aqueous absorbent at the aforementioned composition, a part of the bottom liquid of the stripping column 4 is conveyed via a line 6 to ethylene glycol recovering step, and fresh water is added via a line 7 to the aqueous absorbent. Further, a defoaming agent, say, an aqueous emulsion of silicone oil, is continuously or intermittently added via a line 8 to the aqueous absorbent. If necessary, an aqueous solution of a compound which exhibits alkalinity on solution in the aqueous absorbent, say, an aqueous sodium hydroxide solution, is also added via a line 12 to the aqueous absorbent.

The gas that comes out from the top of the absorption column 2 is conveyed as recycle gas to the reactor via a line 10. On the other hand, the ethylene oxide-containing gas leaving the top of the ethylene oxide stripping column 4 is conveyed via a line 11 to the ethylene oxide purification step.

In accordance with the present invention, there is the advantage that the problems that arise from the entrainment by flooding due to the foaming of the aqueous absorbent such, for example, as the problem of reduction in the rate of absorption of ethylene oxide, the problem that the normal operation of the absorption column is almost impossible, and the problem that catalyst contained in the reactor is damaged by the admixture in the recycle gas of a part of the aqueous absorbent are all resolved at once. Hence, the method of this invention is highly effective and of great commercial significance in those cases where the per unit production of ethylene oxide is great and the absorption column is of large capacity.

The following examples are given for more fully illustrating the invention, it being understood that the invention is not limited thereto. The absorption rate and the absorption column capability are defined as follows:

The absorption rate in the amount expressed in percentage of the ethylene oxide absorbed at the absorption column based on the amount of ethylene oxide at the entrance to the absorption column.

The absorption column capability is represented by the amount of the aqueous absorbent at the time when an abrupt rise takes place in the pressure drop between top and bottom of the columns when the amount of the aqueous absorbent introduced into the absorption column is being gradually increased, while maintaining the amount of the reaction product gas passing through the column at a constant value. This capability means the maximum amount of the aqueous absorbent that can be introduced into the absorption column. If the aqueous absorbent is introduced in an amount exceeding the above maximum amount, entrainment phenomenon by flooding occurs and becomes intense to cause difficulty to be experienced in the operation of the absorption column.

EXAMPLES 1 – 15

A reaction product gas containing 1.0% by volume of ethylene oxide was introduced via a line (1) at a flow rate of 4500 Nm$^3$/min to a tray type absorption column (2) consisting of flexi trays held at an operating pressure of 22 kg/cm$^2$. An aqueous absorbent of a composition shown in Table 1 whose temperature had been maintained at 30° C. was conveyed via a line 9 to the top of the absorption column 2, where it was countercurrently contacted with the reaction product gas. The absorption rate and absorption column capability were measured with the results shown in Table 1.

The gas leaving the top of the absorption column 2 containing substantially no ethylene oxide was recycled via a line 10 to the reactor as recycle gas. The ethylene oxide-containing aqueous solution leaving the bottom of the absorption column 2 was conveyed via a line 3 to an ethylene oxide stripping column 4, where the ethylene oxide was stripped from the aqueous solution by heating. The ethylene oxide-containing gas leaving the top of the ethylene oxide stripping column 4 was conveyed via a line 11 to the ethylene oxide purification step, while the remaining aqueous solution leaving the bottom of the ethylene oxide stripping column 4 was conveyed via a line 9 to the absorption column 2 for reuse as the aqueous absorbent.

For maintaining the composition of the aqueous absorbent at that shown in Table 1, a part of the remaining aqueous solution leaving the bottom of the ethylene oxide stripping column 4 was transferred via a line 6 to ethylene glycol recovering step, and fresh water was added to the aqueous absorbent via a line 7. Further, an aqueous emulsion whose concentration of dimethylpolysiloxane containing the trimethylsiloxy group and trimethylsilyl group was 1.0% by weight was added to the aqueous absorbent via a line (8).

Table 1

| Ex. No. | Defoaming agent concentration (ppm) | pH | Ethylene glycol concentration (wt. %) | Absorption column capability (liter/min) | Absorption rate (%) |
|---|---|---|---|---|---|
| 1 | 20 | 6 | 10 | 5450 | 100 |
| 2 | 20 | 5 | 10 | 5450 | 100 |
| 3 | 20 | 10 | 10 | 5450 | 100 |
| 4 | 20 | 5 | 1 | 5450 | 100 |
| 5 | 20 | 10 | 1 | 5450 | 100 |
| 6 | 20 | 5 | 30 | 5000 | 100 |
| 7 | 20 | 10 | 30 | 5000 | 100 |
| 8 | 2 | 5 | 10 | 5450 | 100 |
| 9 | 2 | 10 | 1 | 5450 | 100 |
| 10 | 2 | 5 | 30 | 5000 | 100 |
| 11 | 2 | 10 | 30 | 5000 | 100 |
| 12 | 500 | 5 | 1 | 5450 | 100 |
| 13 | 500 | 10 | 1 | 5450 | 100 |
| 14 | 500 | 5 | 15 | 5000 | 100 |
| 15 | 500 | 10 | 15 | 5450 | 100 |

CONTROLS 1 – 2

Except that the aqueous absorbent does not contain a defoaming agent, the experiments were operated as in Examples 1 – 15. The absorption rate and absorption column capability were measured with the results shown in Table 2.

Table 2

| Control No. | Defoaming agent concentration (ppm) | pH | Ethylene glycol concentration (wt. %) | Absorption column capability (liter/min) | Absorption rates % |
|---|---|---|---|---|---|
| 1 | 0 | 5 | 10 | 2750 | 89.5 |
| 2 | 0 | 6 | 10 | 2700 | 90.0 |

CONTROL 3

The experiment was operated as in Example 8, except that the aqueous absorbent had a pH of 2.0. The absorption rate and absorption column capability were measured with the results shown in Table 3.

CONTROL 4

Example 8 was repeated, except that an aqueous absorbent having a pH 13.5 was used. On measurement of the absorption rate and absorption column capability, the results shown in Table 3 were obtained.

Table 3

| Control No. | Composition of aqueous absorbent Defoaming agent concentration (ppm) | pH | Ethylene glycol concentration (wt. %) | Absorption column capability (liter/min) | Absorption rate % |
|---|---|---|---|---|---|
| 3 | 2 | 2.0 | 10 | 3550 | 95.0 |
| 4 | 2 | 13.5 | 10 | 3700 | 97.1 |

EXAMPLE 16

The aqueous solution withdrawn via line 6 from the ethylene oxide stripping column 4 in Example 1 was concentrated to an ethylene glycol concentration of 80 weight %. This 80 weight % aqueous glycol solution was conveyed to a distillation column whose pressure had been reduced to 50 – 90 mm Hg, and 98% by weight of the aqueous glycol solution fed was distilled off. This distilled aqueous glycol solution was conveyed to a dehydration tower, where the ethylene glycol and water were separated, following which ethylene glycol was fractionated from the glycol component by distillation at a reduced pressure of 20 mm Hg. Tests for determining the properties of this ethylene glycol were conducted with the results shown in Table 4.

CONTROL 5

The aqueous solution withdrawn via line 6 from the ethylene oxide stripping column in Control 3 was treated by the same method as that used in Example 16 to obtain ethylene glycol. Tests for determining the properties of this ethylene glycol were conducted. The results obtained are shown in Table 4.

CONTROL 6

The aqueous solution withdrawn via line 6 from the ethylene oxide stripping column in Control 4 was treated as in Example 16 to obtain ethylene glycol. The so obtained ethylene glycol was tested for its properties. The results obtained are shown in Table 4.

CONTROL 7

The experiment is operated as in Example 7, except that the aqueous absorbent used was one whose ethylene glycol concentration was 45 weight %. On measurement of the absorption rate and absorption column capability, the former was 99.0% and the latter was 5000 liter/minute.

The aqueous solution withdrawn via line 6 from the ethylene oxide stripping column in this operation was treated by the same method as that used in Example 16 to obtain ethylene glycol. Tests for determining the properties of the so obtained ethylene glycol were conducted with the results shown in Table 4.

Table 4

| | Properties of ethylene glycol | | | | |
|---|---|---|---|---|---|
| | Acid content* (as $CH_3COOH$, wt %) | pH | Color (APHA) | | |
| Experiment | | | Before test** | After boiling test*** | After heating test w/NCl**** |
| Example 16 | 0.0008 | 6.3 | 5 or less | 5 or less | 5 or less |
| Control 5 | 0.012 | 4.5 | 15 | 30 | 50 |
| Control 6 | 0.0006 | 8.1 | 10 | 20 | 30 |
| Control 7 | 0.0008 | 6.1 | 10 | 20 | 35 |

Note:
*Measured in accordance with JIS Method K 1527.
**Color of ethylene glycol before conducting tests.
***Color of ethylene glycol after boiling for 2 hours.
****Color of ethylene glycol after the addition of 1.0 % by volume of concentrated hydrochloric acid and boiling for 30 seconds.

EXAMPLES 17 – 31

The experiments were operated as in Examples 1 – 15, except that dimethylpolysiloxane containing alkoxy groups was used as the defoaming agent to be added to the aqueous absorbent, and the reaction product gas was passed through the absorption column at the flow rate of 5000 $Nm^3$/min. On measurement of the absorption rate and absorption column capability, the results shown in Table 5 were obtained.

Table 5

| Ex. No. | Composition of aqueous absorbent Defoaming agent concentration (ppm) | pH | Ethylene glycol concentration (wt %) | absorption column capability (liter/min) | Absorption rate % |
|---|---|---|---|---|---|
| 17 | 20 | 6 | 10 | 4800 | 100 |
| 18 | 20 | 5 | 10 | 4800 | 100 |
| 19 | 20 | 10 | 10 | 4800 | 100 |
| 20 | 20 | 5 | 1 | 4800 | 100 |
| 21 | 20 | 10 | 1 | 4800 | 100 |
| 22 | 20 | 5 | 30 | 4850 | 100 |
| 23 | 20 | 10 | 30 | 4850 | 100 |
| 24 | 2 | 5 | 10 | 4800 | 100 |
| 25 | 2 | 10 | 1 | 4800 | 100 |
| 26 | 2 | 5 | 30 | 4850 | 100 |
| 27 | 2 | 10 | 30 | 4850 | 100 |
| 28 | 500 | 5 | 1 | 4800 | 100 |
| 29 | 500 | 10 | 1 | 4800 | 100 |
| 30 | 500 | 5 | 15 | 4850 | 100 |
| 31 | 500 | 10 | 15 | 4800 | 100 |

EXAMPLES 32 – 46

The experiments were operated as in Examples 1 – 15, except that sieve trays were substituted for the flexi trays. The absorption rate and absorption column capability were then determined with the results shown Table 6.

Table 6

| Ex. No. | Defoaming agent concentration (ppm) | pH | Ethylene glycol concentration (wt %) | Absorption column capability (liter/min) | Absorption rate % |
|---|---|---|---|---|---|
| 32 | 20 | 6 | 10 | 5220 | 100 |
| 33 | 20 | 5 | 10 | 5220 | 100 |
| 34 | 20 | 10 | 10 | 5220 | 100 |
| 35 | 20 | 5 | 1 | 5250 | 100 |
| 36 | 20 | 10 | 1 | 5250 | 100 |
| 37 | 20 | 5 | 30 | 5200 | 100 |
| 38 | 20 | 10 | 30 | 5200 | 100 |
| 39 | 2 | 5 | 10 | 5220 | 100 |
| 40 | 2 | 10 | 1 | 5250 | 100 |
| 41 | 2 | 5 | 30 | 5200 | 100 |
| 42 | 2 | 10 | 30 | 5200 | 100 |
| 43 | 500 | 5 | 1 | 5250 | 100 |
| 44 | 500 | 10 | 1 | 5250 | 100 |
| 45 | 500 | 5 | 15 | 5200 | 100 |
| 46 | 500 | 10 | 15 | 5200 | 100 |

CONTROLS 8 – 9

The experiments were operated as in Controls 1 – 2, except that sieve trays were substituted for the flexi trays. On measurement of the absorption rate and absorption column capability, the results shown in Table 7 were obtained.

Table 7

| Control No. | Defoaming agent concentration (ppm) | pH | Ethylene glycol concentration (wt %) | Absorption column capability (liter/min) | Absorption rate % |
|---|---|---|---|---|---|
| 8 | 0 | 5 | 10 | 2700 | 89.0 |
| 9 | 0 | 6 | 10 | 2700 | 88.0 |

EXAMPLES 47 – 61

The experiments were operated as in Examples 17 – 31, except that sieve trays were substituted for the flexi trays. The absorption rate and absorption column capability were then measured with the results shown Table 8.

Table 8

| Ex. No. | Defoaming agent concentration (ppm) | pH | Ethylene glycol concentration (wt. %) | Absorption column capability (liter/min) | Absorption rate % |
|---|---|---|---|---|---|
| 47 | 20 | 6 | 10 | 4800 | 100 |
| 48 | 20 | 5 | 10 | 4800 | 100 |
| 49 | 20 | 10 | 10 | 4800 | 100 |
| 50 | 20 | 5 | 1 | 4800 | 100 |
| 51 | 20 | 10 | 1 | 4800 | 100 |
| 52 | 20 | 5 | 30 | 4850 | 100 |
| 53 | 20 | 10 | 30 | 4850 | 100 |
| 54 | 2 | 5 | 10 | 4800 | 100 |
| 55 | 2 | 10 | 1 | 4800 | 100 |
| 56 | 2 | 5 | 30 | 4850 | 100 |
| 57 | 2 | 10 | 30 | 4850 | 100 |
| 58 | 500 | 5 | 1 | 4800 | 100 |
| 59 | 500 | 10 | 1 | 4800 | 100 |
| 60 | 500 | 5 | 15 | 4800 | 100 |
| 61 | 500 | 10 | 15 | 4800 | 100 |

What is claimed is:

1. In the method of recovering ethylene oxide from the reaction product gas that is obtained by the catalytic vapor phase oxidation of ethylene with molecular oxygen over a silver-containing catalyst, which comprises conducting the said reaction product gas to an absorption column maintained at a pressure in the range of 2 – 40 kg/cm$^2$, countercurrently contacting said reaction product gas with an aqueous absorbent at said absorption column to dissolve ethylene oxide in the aqueous absorbent to form an aqueous ethylene oxide solution, conducting the thus formed aqueous solution to a stripping column, stripping and recovering ethylene oxide from said aqueous ethylene oxide solution at said stripping column, and thereafter recycling the remaining aqueous solution which is obtained after stripping ethylene oxide to said absorption column to be again used as the aqueous absorbent, the improvement of using as said aqueous absorbent one consisting essentially of ethylene glycol in the range of 1 – 30% by weight, 99 – 70% by weight of water and a defoaming agent consisting essentially of an organopolysiloxane in the range of 2 – 500 ppm and having a pH in the range of 3 – 12.

2. The method of claim 1 wherein said aqueous absorbent is one containing ethylene glycol in the range of 1 – 30% by weight and a defoaming agent in the range of 2 – 500 ppm and having a pH in the range of 5 – 10.

3. The method of claim 1 wherein said organopolysiloxane defoaming agent consists essentially of a dimethylpolysiloxane represented by the formula

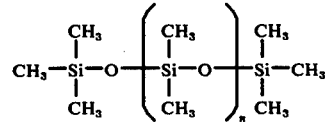

wherein $10,000 > n > 1$.

4. The method of claim 3 wherein $1,000 > n > 1$.

5. The method of claim 1 wherein said organopolysiloxane defoaming agent consists essentially of a dimethylpolysiloxane of the formula

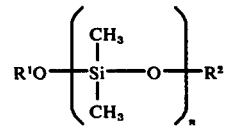

wherein $R^1$ and $R^2$ are each a member selected from the group consisting of hydrogen and the same or different alkyl groups, and $10,000 > n > 1$.

6. The method of claim 5 wherein $1,000 > n > 1$.

7. In the method of recovering ethylene oxide from the reaction product gas that is obtained by the catalytic vapor phase oxidation of ethylene with molecular oxygen, which comprises conducting the said reaction product gas to an absorption column maintained at a pressure in the range of 2 – 40 kg/cm$^2$, countercurrently contacting said reaction product gas with an aqueous absorbent at said absorption column to dissolve ethylene oxide in the aqueous absorbent to form an aqueous ethylene oxide solution, conducting the thus formed aqueous solution to a stripping column, stripping and recovering ethylene oxide from said aqueous ethylene oxide solution at said stripping column, and thereafter recycling the remaining aqueous solution which is obtained after stripping ethylene oxide to said absorption column to be again used as the aqueous absorbent, the improvement of using as said aqueous absorbent one consisting essentially of ethylene glycol in the range of 1 – 30% by weight, 99 – 70% by weight of water and a defoaming agent selected from the group consisting of a dimethylpolysiloxane represented by the formula

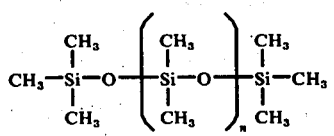

wherein $10,000 > n > 1$, and a dimethylpolysiloxane of the formula

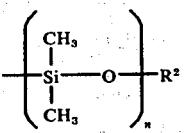

wherein $R^1$ and $R^2$ are each a member selected from the group consisting of hydrogen and the same or different alkyl groups, and $10,000 > n > 1$, in the range of 2 – 500 ppm and having a pH in the range of 5 – 10 at a temperature not higher than 40° C.

* * * * *